S. J. FERRISS.
MACHINE FOR CUTTING ICE.
APPLICATION FILED JULY 27, 1912.
1,067,328.
Patented July 15, 1913.
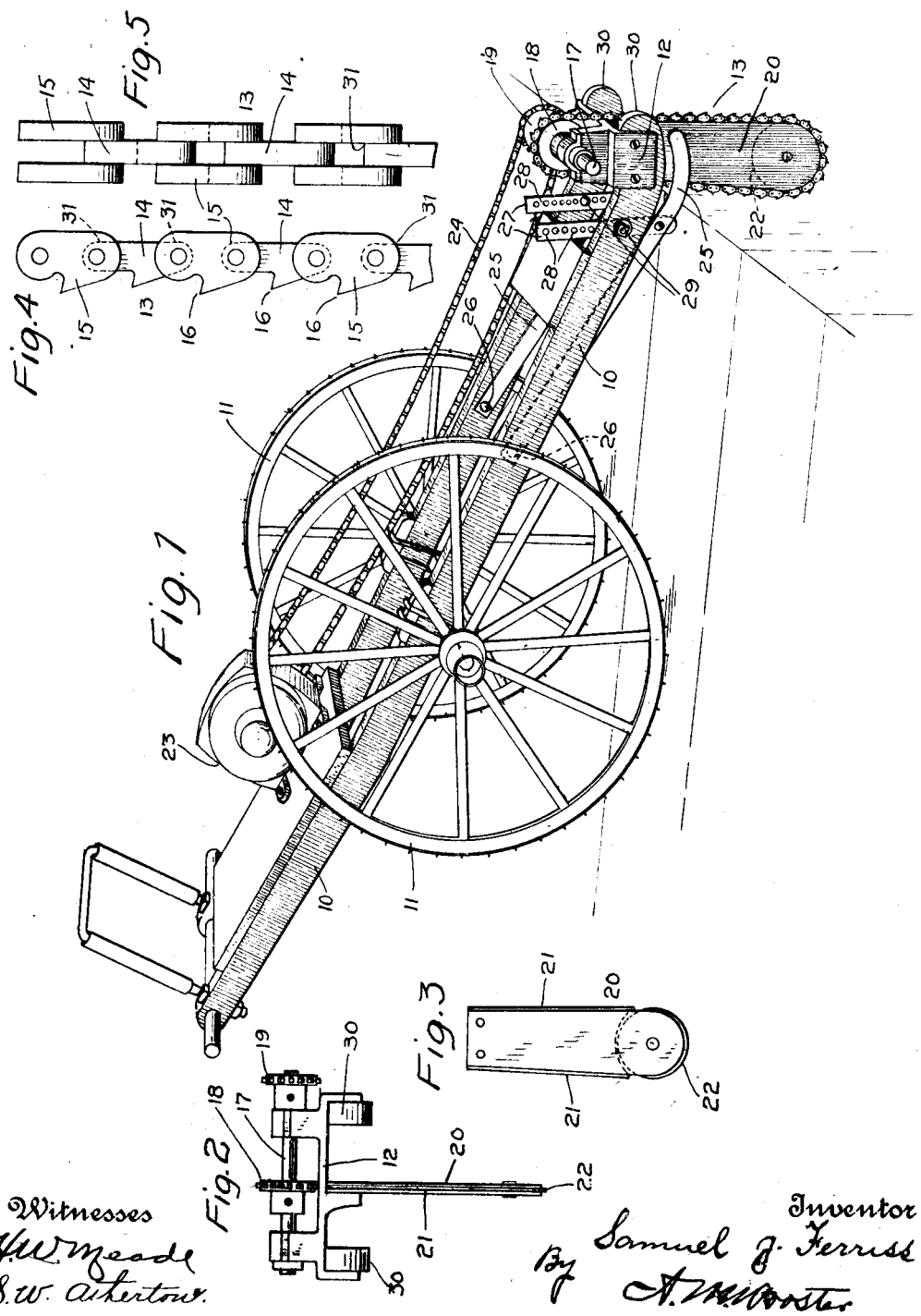
Witnesses
H. W. Meade
S. W. Atherton
Inventor
Samuel J. Ferriss
By A. W. Wooster
Attorney

UNITED STATES PATENT OFFICE.

SAMUEL J. FERRISS, OF NEW MILFORD, CONNECTICUT.

MACHINE FOR CUTTING ICE.

1,067,328.  Specification of Letters Patent.  Patented July 15, 1913.

Application filed July 27, 1912. Serial No. 711,849.

*To all whom it may concern:*

Be it known that I, SAMUEL J. FERRISS, a citizen of the United States, residing at New Milford, county of Litchfield, State of Connecticut, have invented an Improvement in Machines for Cutting Ice, of which the following is a specification.

This invention has for its object to provide a simple and inexpensive ice cutting machine which shall be adapted for general use as upon the frozen surface of a river or lake to cut the ice into cakes or to separate cakes that have previously been plowed or scored and which shall be especially adapted for use in ice houses to separate cakes of ice that have become frozen solidly together or to cut large cakes into smaller ones for delivery, in the quickest time possible and with the least possible waste of ice, it being an important feature of the present machine that in addition to making a cut of any required depth within its capacity it will cut close to a wall or in a corner, which has heretofore been impossible so far as I am aware, thereby effecting a great saving of the operator's time and reducing the loss from pulverized and broken ice to the minimum.

A further object of the invention is to provide a novel endless jointed ice cutting saw and carrying means therefor.

With these and other objects in view I have devised a novel ice cutting machine and saw therefor of which the following description in connection with the accompanying drawing is a specification, reference characters being used to indicate the several parts.

Figure 1 is a perspective view illustrating my novel machine as in use; Fig. 2 a front elevation of the frame with the driving chain and saw removed; Fig. 3 an elevation of the saw carrier detached, and Fig. 4 is a side elevation and Fig. 5 a plan view, on an enlarged scale, illustrating the construction of the saw.

10 denotes the frame of my novel machine which may be of any ordinary or preferred construction, the frame illustrated consisting simply of side bars rigidly secured together by cross pieces. The frame is mounted upon wheels 11 and is shown as provided at the forward end with a cross bar and handle for convenience in operation. At the opposite end of the frame and rigidly secured thereto is a bracket 12 by which my novel saw 13 is carried. The saw consists of series of central plates 14 and side plates 15, the ends of the central plates being riveted between pairs of side plates and both central plates and side plates being provided on one side with cutting teeth 16, shaped to cut in one direction only.

17 denotes a shaft mounted upon the bracket and carrying a sprocket wheel 18 and a pulley 19 which may be a belt or sprocket pulley, as preferred. The saw is carried by sprocket wheel 18 and runs over a carrier 20, substantially vertically disposed, which is rigidly secured to the bracket. The sides of the carrier are provided with ribs 21 and at the lower end thereof is an idler wheel 22, opposite edges of which are in alinement with the ribs. It will be noted (see Fig. 4) that the side plates of the saw are wider than the central plates, leaving a groove 32 in the back of the saw between the side plates. This groove receives the ribs on the carrier and the periphery of the idler wheel and is thereby retained securely in place, but remains free to be operated by sprocket wheel 18. The shaft and sprocket wheel may be driven in any suitable manner, as, for example, by a motor 23, carried by the frame, from which a belt or sprocket chain 24 extends to pulley 19 on the shaft.

As a convenient means of regulating the depth of the cut, I provide shoes 25 which are pivoted to the side pieces of the frame, as at 26, and are curved at their rear ends to adapt them to bear upon the ice. The shoes are adjusted to give any required depth of cut within the capacity of the machine by means of links 27 pivoted to the shoes and each provided with a series of holes 28 through any one of which and through the side bar of the frame a bolt 29 may be passed.

The operation is as follows: Having regulated the depth of the cut in the manner just described, the operator backs the frame to the starting place, it being immaterial if the frame is placed in contact with a wall as the ends of the side pieces, indicated by 30, will serve as fenders to prevent contact of the saw with the wall. Having placed the saw in position, the motor or other driving means is started and the front end of the frame is tilted upward which presses the rear end downward and causes the saw to cut into the ice. The operator then draws the frame forward as rapidly as the saw will cut its way which will depend of course upon the depth of the cut and the quality of the ice. In practice under ordinary conditions my novel saw cuts very fast.

Having thus described my invention I claim:

1. A machine for cutting ice comprising a frame provided with spaced apart side bars, wheels supporting said frame, sawing mechanism mounted between said side bars at one end of the frame, means for actuating said sawing mechanism, gage shoes each pivoted at one end to one of said side bars, and means for adjusting said gage shoes.

2. A machine for cutting ice comprising a frame provided with spaced apart side bars, wheels supporting said frame, sawing mechanism mounted between said side bars at one end of the frame, means for actuating said sawing mechanism, gage shoes each pivoted at one end to one of said side bars, links connected with said gage shoes, and means for securing said links to said side bars.

3. A machine for cutting ice, comprising a frame provided with spaced apart side bars, a bracket attached to the rear ends of the side bars, a carrier depending from the bracket, a cutting chain supported by the carrier and means for actuating the cutting chain.

4. A machine for cutting ice, comprising a frame provided with spaced apart side bars, a vertically disposed carrier mounted between said bars, a cutting chain supported by said carrier, the ends of the side bars projecting beyond the cutting chain, for the purpose specified, and means for actuating the cutting chain.

In testimony whereof I affix my signature in presence of two witnesses.

SAMUEL J. FERRISS.

Witnesses:
HENRY S. TURRILL,
JOHN F. ADDIS.